United States Patent [19]
Maroney

[11] Patent Number: 5,829,497
[45] Date of Patent: Nov. 3, 1998

[54] TELESCOPING AND RECIPROCATING STUMP GRINDER

[76] Inventor: Freeman D. Maroney, Rte. 1, Box 210, Marshfield, Mo. 65706

[21] Appl. No.: 866,696

[22] Filed: May 30, 1997

[51] Int. Cl.⁶ .......................... A01G 23/00; A01G 23/06
[52] U.S. Cl. ................ 144/24.12; 144/337; 241/101.72; 241/101.74; 37/92; 180/53.7
[58] Field of Search ................................ 37/301, 302, 92; 144/24.12, 34.1, 334; 180/53.7; 241/101.71, 101.72, 101.74

[56] References Cited

U.S. PATENT DOCUMENTS

| | | |
|---|---|---|
| Re. 28,651 | 12/1975 | Welborn . |
| 3,911,979 | 10/1975 | Rousseu . |
| 4,271,879 | 6/1981 | Shivers, Jr. et al. ................. 144/24.12 |
| 4,530,385 | 7/1985 | York . |
| 4,621,668 | 11/1986 | York . |
| 4,681,145 | 7/1987 | York . |
| 4,709,736 | 12/1987 | Bellars . |
| 4,998,573 | 3/1991 | York ...................................... 144/24.12 |
| 5,289,859 | 3/1994 | Minton, Jr. et al. ................. 144/24.12 |
| 5,435,359 | 7/1995 | Craft ........................................ 144/334 |
| 5,655,581 | 8/1997 | Craft ..................................... 144/24.12 |
| 5,657,803 | 8/1997 | Kappel et al. ........................ 144/24.12 |

*Primary Examiner*—W. Donald Bray
*Attorney, Agent, or Firm*—Litman, McMahon & Brown, L.L.C.

[57] ABSTRACT

A stump grinder designed for pivotable attachment to the three point hitch of an agricultural tractor via a pivot frame and includes a stump grinding wheel driven by the tractor PTO. The stump grinder includes a frame with an outer sleeve which telescopes over an inner sleeve, which inner sleeve is attached, in turn, to a stump grinder assembly which includes the grinding wheel. A first, telescoping hydraulic piston & cylinder unit selectively extends the stump grinding assembly and a second reciprocating piston & cylinder unit selectively pivots or reciprocates the stump grinder assembly from side to side. An optional hydraulic pump can be attached to the stump grinder assembly to drive one or both piston & cylinder units if the tractor is not so equipped.

7 Claims, 2 Drawing Sheets

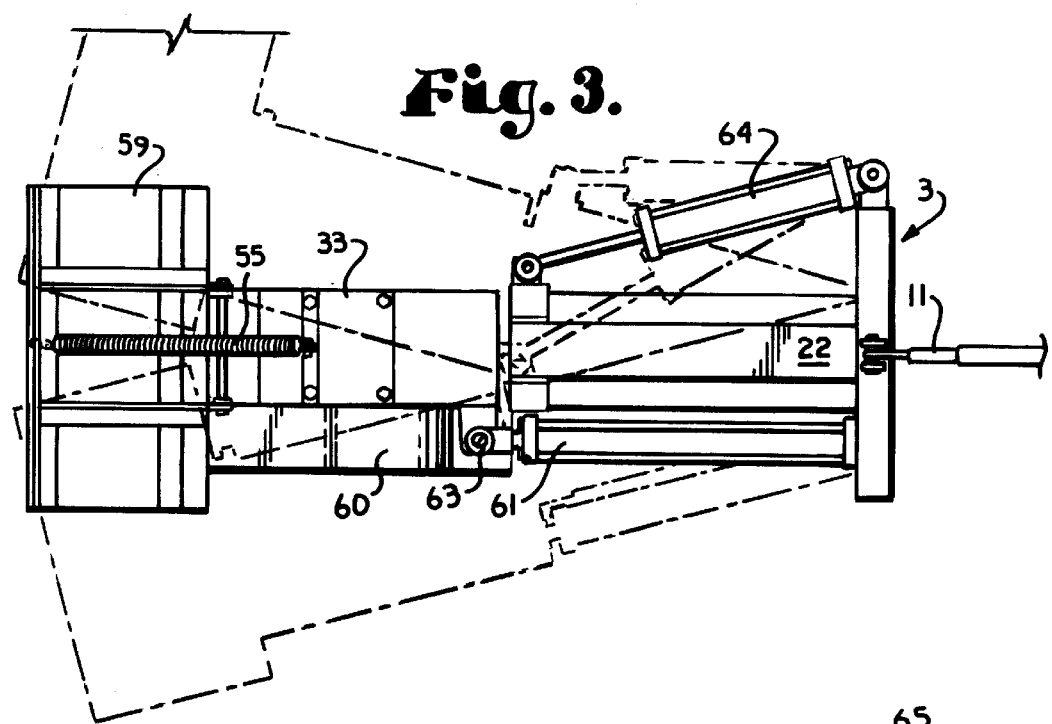
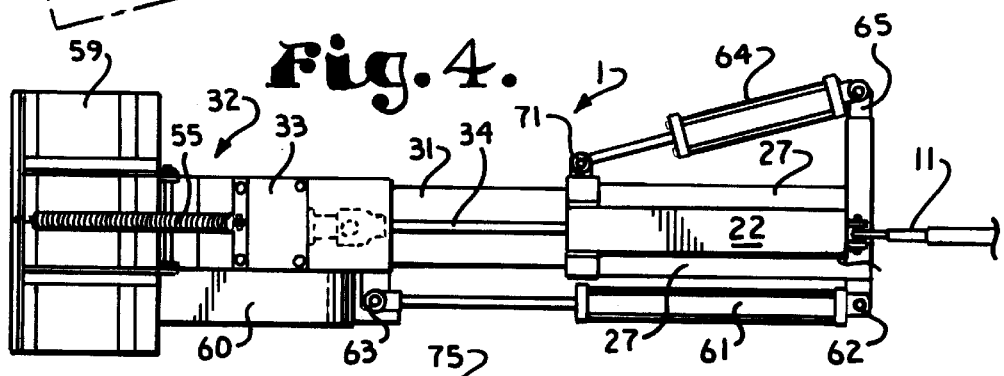
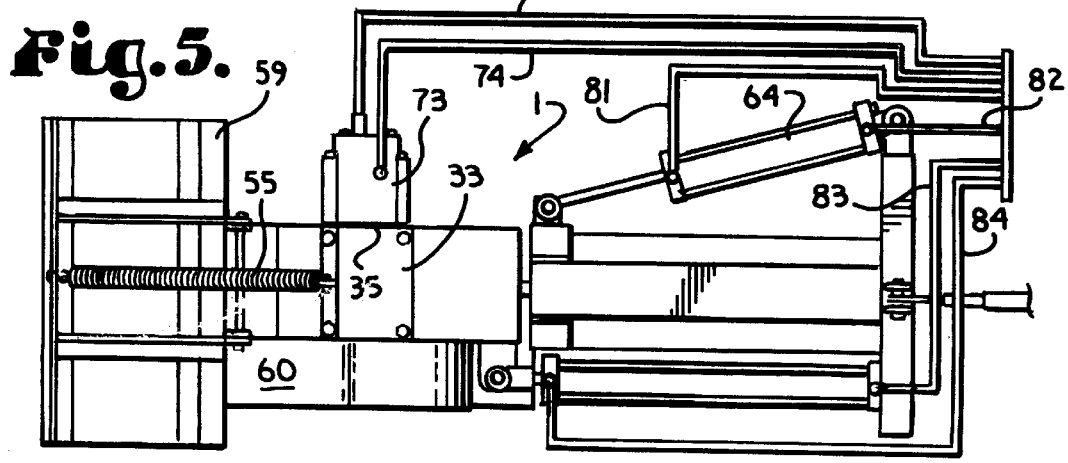

5,829,497

TELESCOPING AND RECIPROCATING STUMP GRINDER

FIELD OF THE INVENTION

The present invention relates to a telescoping and reciprocating stump grinder designed for attachment to a three point hitch of an agricultural tractor. More particularly, the inventive stump grinder includes a power takeoff (PTO) driven rotary grinding wheel as part of a stump grinding assembly which is selectively extendable via a first hydraulic piston & cylinder unit and selectively reciprocable via a second hydraulic piston & cylinder.

BACKGROUND OF THE INVENTION

Prior art tractor mounted stump grinders are known, and take a variety of forms. For example, in U.S. Pat. No. 3,911,979 to Rousseau, a PTO driven stump grinder is mounted on a wheeled carriage and includes a pair of hydraulic piston & cylinder units which move the wheeled carriage back and forth to reciprocate a pair of grinding wheels over the stump.

In U.S. Pat. Nos. 4,530,385, 4,621,668, 4,681,145 to York, a number of tractor PTO driven stump grinders include large wheels are driven directly by the PTO shaft. Movement of the wheels fore and aft is accomplished via a rear mounted hydraulic piston & cylinder unit.

U.S. Pat. No. 4,709,736 to Bellars and U.S. Pat. No. 5,435,359 to Craft also involve tractor mounted, PTO driven stump grinders with hydraulic piston & cylinder units providing movement.

With each of the above-mentioned stump grinders, in order to completely grind a stump of a diameter greater than a single path of the grinding wheel, the tractor must be moved either forward or backward or from side to side. This adds wear and tear to the machinery, both tractor and stump grinder, increases the amount of time required to grind the stump and adds to the operator work load.

It is clear that a need exists for a tractor mounted stump grinder which allows an operator to position the tractor proximate a stump and grind the entire stump without requiring the tractor to be moved.

SUMMARY OF THE INVENTION

The present invention is directed to a stump grinder designed for attachment to the three point hitch of an agricultural tractor with a stump grinding wheel driven by the tractor PTO. A pivot frame includes a centered receiver which receives a pin for attachment of the center link of the three point hitch. The pivot frame tapers downward and outward from the centered receiver to a pair of vertical sides, each of which includes a protruding pin which is positioned to engage a respective one of the side links of the three point hitch. The pivot frame includes two pivot points, an upper pivot arm which pivotably engages an upper frame member of a stump grinder frame and a lower pivot slot which engages a lower frame member of the stump grinder frame. The lower frame member of the stump grinder frame forms an outer sleeve which telescopes over an inner sleeve, which inner sleeve is attached, in turn, to a stump grinder assembly which includes the grinding wheel. A first, telescoping hydraulic piston & cylinder unit is attached between the lower frame member and the inner telescoping sleeve such that extension of the telescoping piston & cylinder unit extends the stump grinder assembly away from the tractor and retraction of the telescoping piston & cylinder unit retracts the stump grinder assembly back toward the tractor. A reciprocating hydraulic piston & cylinder unit is attached between the pivot frame and the lower frame member such that extension of the reciprocating piston & cylinder unit swings the entire stump grinder to the left and retraction of the reciprocating piston & cylinder unit swings the entire stump grinder to the right. Both hydraulic piston & cylinder units are preferably driven from tractor mounted hydraulic pumps, valves and fittings. As a variation, an optional hydraulic pump can be attached to the stump grinder assembly to drive one or both piston & cylinder units if the tractor is not so equipped.

OBJECTS AND ADVANTAGES OF THE INVENTION

The principal objects of the present invention include: providing an improved telescoping and reciprocating stump grinder; providing such a stump grinder designed for attachment to an agricultural tractor; providing such a stump grinder which is driven by the tractor PTO; providing such a stump grinder which can be selectively extended and retracted and reciprocated from side to side via respective hydraulic piston & cylinder units; providing such a stump grinder which allows an operator to grind an entire stump without repositioning the tractor; and providing such a stump grinder which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged, top elevational view of the stump grinder of FIG. 1, shown in solid lines in a centered position with the telescoping piston & cylinder unit retracted and outlined in dotted lines in left and right reciprocated positions.

FIG. 4 is an enlarged, top elevational view of the stump grinder of FIG. 1, shown in a centered position, but with the telescoping piston & cylinder unit extended.

FIG. 5 is an enlarged, top elevational view of the stump grinder of FIG. 1, shown in a centered, retracted position, and equipped with an auxiliary hydraulic pump driven by a gear box on the stump grinder assembly.

DETAILED DESCRIPTION OF THE INVENTION

Figure 1:
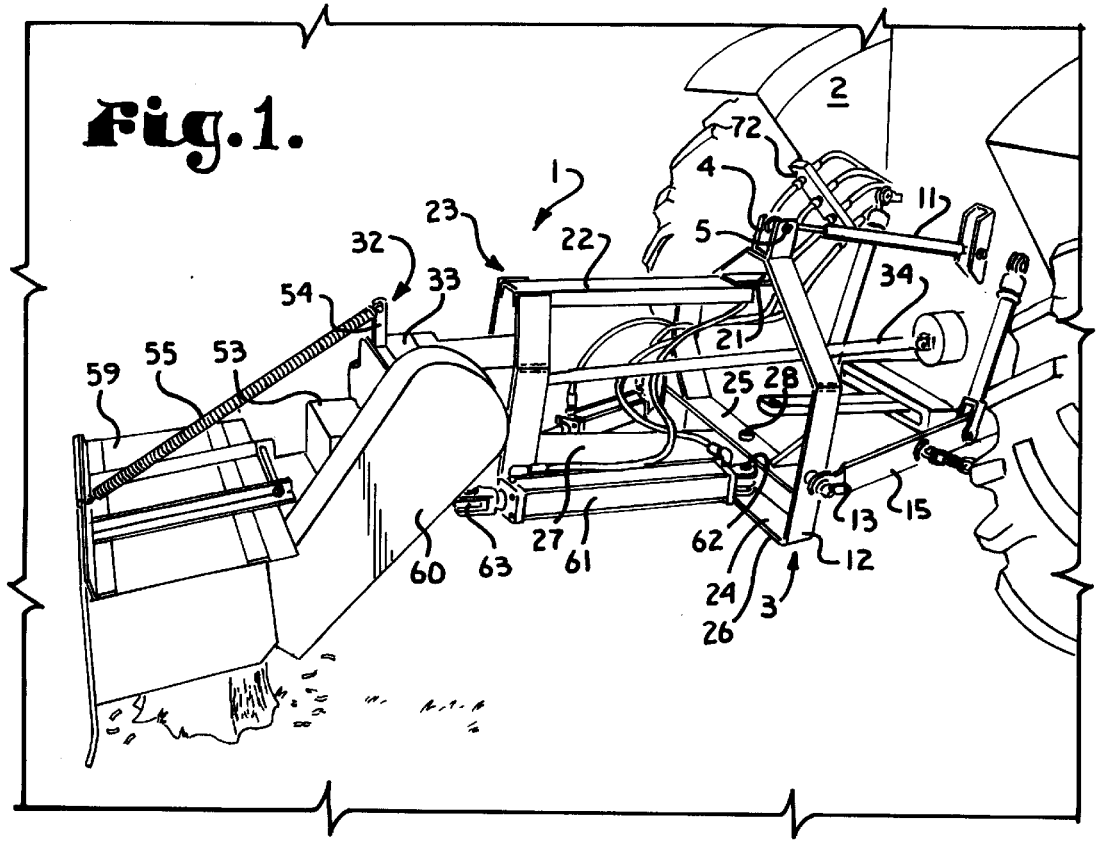
FIG. 1 is a perspective view of a stump grinder in accordance with the present invention, shown attached to the three point hitch and the PTO of an agricultural tractor.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1–4, a telescoping and reciprocating stump grinder is illustrated and indicated generally at 1. The stump grinder 1 is shown attached to an agricultural tractor 2 via a pivot frame 3. The pivot frame 3 includes a centered receiver 4 which receives a pin 5 for attachment of a center link 11 of the tractor three point hitch. The pivot frame 3 tapers downward and outward on either side from the centered receiver 4 to form a pair of vertical side members 12, each of which includes a protruding pin 14 which is positioned to engage a respective side link 15 of the three point hitch. The pivot frame 3 includes two pivot points, an upper pivot arm 21 which pivotably engages an upper frame member 22 of a stump grinder frame 23 and a lower pivot slot 24 formed between an intermediate horizontal member 25 and a bottom horizontal member 26. The slot 24 engages a lower frame member 27 of the stump grinder frame 23 via a pivot pin 28. The lower frame member 27 of the stump grinder frame 23 is a length of square steel tubing which forms an outer sleeve which telescopes over an inner sleeve 31, which inner sleeve 31 is also a length of square steel tubing attached at a rear end thereof to a stump grinder assembly 32.

Figure 2:
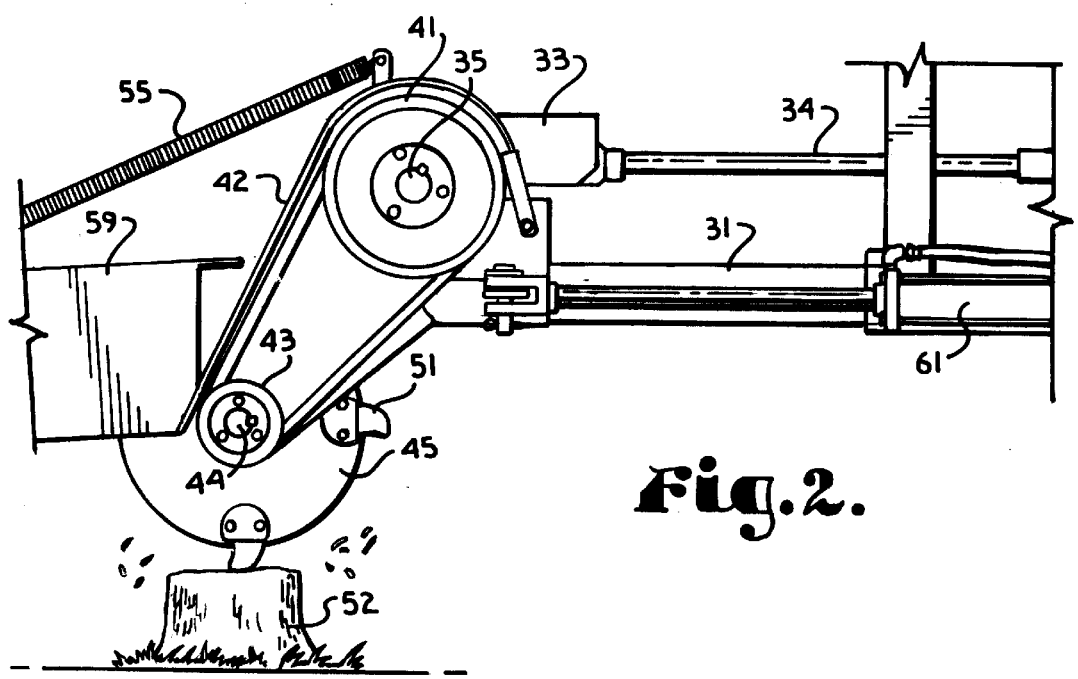
FIG. 2 is an enlarged, fragmentary, side elevational view of a stump grinder assembly with portions of a housing broken away to reveal a grinding wheel with grinding teeth contacting a stump and with a telescoping hydraulic piston & cylinder unit extended.

The stump grinder assembly 32 includes a gear box 33 which is connected to a telescoping PTO drive shaft 34. The gear box 33 translates the rotary motion of the PTO shaft 34 into a lateral rotary motion of a drive shaft 35 (FIG. 2). The drive shaft 35 is attached to a sheave 41 which drives a plurality of drive belts 42. The belts 42, in turn, drive a second sheave 43 to which is attached a drive shaft 44 which drives a grinding wheel 45. The grinding wheel 45 supports a plurality of grinding teeth 51 which extend generally radially outward from the wheel 45. The teeth 51, which are preferably made of hardened steel, when rotated with the wheel 45, act to grind away stumps, such as the stump 52, which they contact.

The gear box 33 is attached to a support 53 which includes an upright arm 54 to which is attached one end of a spring 55. A second end of the spring 55 is attached to a hinged protective enclosure 59 which serves to protect bystanders and the operator from flying debris generated by the grinding teeth 51. A protective belt guard housing 60 is positioned over the belts 42 and the sheaves 41 and 43.

A first, telescoping hydraulic piston & cylinder unit 61 has one end attached to a clevis 62 which is welded to the lower frame member 27 at the end proximate the pivot frame 3. A second end of the telescoping piston & cylinder unit 61 is attached to a clevis 63 which is welded to the gear box support 53 whereby extension of the telescoping piston & cylinder unit 61 extends the stump grinder assembly 32 outward and away from the tractor 2, which moves the grinding wheel 45 backward on the stump 52, as shown in FIGS. 2 and 4. Conversely, retraction of the telescoping piston & cylinder unit 61 retracts the stump grinder assembly 32 back toward the tractor 2, and thus moves the grinding wheel 45 forward on the stump 52, as shown in FIGS. 1, 3 and 5.

A second, reciprocating piston & cylinder unit 64 is pivotally attached at one end to a clevis 65 which is welded onto the left side of the pivot frame 3. The opposite end of the reciprocating piston & cylinder unit is attached to a clevis 71 which is attached to the left side of the lower stump grinder frame member 27. Extension of the reciprocating piston & cylinder unit 64 thus pivots the entire stump grinder 1 to the right, which action moves the grinding wheel 45 to the right on the stump 52. Conversely, retraction of the reciprocating piston & cylinder unit 64 pivots the entire stump grinder 1 to the left, which action moves the grinding wheel 45 to the left on the stump 52. Both the telescoping piston & cylinder unit 61 and the reciprocating piston & cylinder unit 64 are double action cylinders connected to hydraulic valves and fittings 72 on the tractor 2, which allow the operator to selectively pivot the grinding wheel 45 backward and forward and from side to side across the stump 52.

FIG. 5 illustrates an alternative hydraulic system for the stump grinder 1 for tractors which are not equipped with adequate hydraulic systems. In the stump grinder 1 of FIG. 5, an auxiliary hydraulic pump 73 is attached to the left side of the gear box 33 such that it is driven by an opposite end of the drive shaft 35. A supply hydraulic line 74 and a return hydraulic line 75 extend forward from the hydraulic pump 73 to valves such as the valves and fittings 72 shown in FIG. 1 on the tractor 2. A first pair of alternative supply and return hydraulic lines 81 and 82 then lead from the valves and fittings 72 to opposing ends of the reciprocating piston & cylinder unit 64 while plurality of a second pair of alternative supply and return hydraulic lines 83 and 84 lead from the valves and fittings 72 to opposing ends of the telescoping piston & cylinder unit 61.

The inventive stump grinder 1 can thus function with any tractor equipped with a three point hitch and PTO to allow an operator to grind entire stumps without repositioning the tractor.

While the stump grinder 1 has been illustrated as including a specialized pivot frame 3, it could be simply attached to an ordinary draw bar of the type generally connected between the side links 15 and 16 with the reciprocating piston & cylinder unit 64 attached to the draw bar as well. Other details of the stump grinder 1 featured herein are exemplary as well, including the relative placement of the piston & cylinder units 61 and 64, and variations in position would work also.

It is to be understood that while certain forms of the present invention have been illustrated and described herein, it is not to be limited to the specific forms or arrangement of parts described and shown.

What is claimed and desired to be secured by Letters Patent is as follows:

1. A stump grinder comprising:
   a. a pivot frame adapted for attachment to a tractor three point hitch, said pivot frame comprising:
      i. a pivot frame with a upper, centered receiver which is shaped and sized to receive and secure a three point hitch center link;
      ii. a pair of vertically oriented side members attached to the centered receiver with each of said side members including engagement means for receiving and securing a respective side link of a tractor three point hitch;
      iii. a cross member connected between said side members; and
      iv. upper and lower pivot mounts;
   b. a stump grinder frame with an upper frame member pivotably attached to said pivot frame upper pivot mount and a telescoping lower frame member with one end pivotably attached to said pivot frame lower pivot mount;

c. a stump grinder assembly attached to an opposite end of said telescoping lower frame member;

d. a telescoping hydraulic piston & cylinder unit with a first end attached to said stump grinder frame lower frame member and a second end attached to said stump grinder assembly; and e. a reciprocating hydraulic piston & cylinder unit with a first end pivotably attached to said pivot frame and a second end attached to said stump grinder frame such that said stump grinder assembly can be selectively telescopically extended relative to said stump grinder frame and said stump grinder frame can be selectively swiveled relative to said pivot frame.

2. A stump grinder as in claim 1, wherein said stump grinder assembly comprises:

a. a gear box which connects to a telescoping PTO shaft;

b. a grinding wheel linked to said gear box such that grinding wheel is rotatably driven by the tractor PTO; and c. a hydraulic pump linked to said gear box.

3. A stump grinder as in claim 2, and further comprising:

(a) at least one hydraulic valve connected to said pump which valve selectively provides hydraulic fluid from said pump to either said telescoping piston & cylinder unit or said reciprocating piston & cylinder unit.

4. A stump grinder comprising:

a. a pivot frame adapted for attachment to a tractor three point hitch, said pivot frame comprising:
 i. a pivot frame with a upper, centered receiver which is shaped and sized to receive and secure a three point hitch center link;
 ii. a pair of vertically oriented side members attached to the centered receiver with each of said side members including engagement means for receiving and securing a respective side link of a tractor three point hitch;
 iii. a cross member connected between said side members; and
 iv. upper and lower pivot mounts;

b. a stump grinder frame with an upper frame member pivotably attached to said pivot frame upper pivot mount and a telescoping lower frame member with one end pivotably attached to said pivot frame lower pivot mount;

c. a stump grinder assembly attached to an opposite end of said telescoping lower frame member, said stump grinder assembly, said stump grinder including:
 i. a gear box which connects to a telescoping PTO shaft;
 ii. a grinding wheel linked to said gear box; and
 iii. a hydraulic pump linked to said gear box;

d. a telescoping hydraulic piston & cylinder unit with a first end attached to said stump grinder frame lower frame member and a second end attached to said stump grinder assembly;

e. a reciprocating hydraulic piston & cylinder unit with a first end pivotably attached to said pivot frame and a second end attached to said stump grinder frame such that said stump grinder assembly can be selectively telescopically extended relative to said stump grinder frame and said stump grinder frame can be selectively swiveled relative to said pivot frame; and f. a dual hydraulic valve which selectively supplies hydraulic fluid from said gear driven hydraulic pump to said telescoping and/or said reciprocating piston & cylinder units.

5. A stump grinder comprising:

a. a pivot frame adapted for attachment to a tractor three point hitch, said pivot frame comprising:
 i. a pivot frame with a upper, centered receiver which is shaped and sized to receive and secure a three point hitch center link;
 ii. a pair of tapered sides each of which tapers downward and outward from the centered receiver to a pair of vertical sides with each vertical side including engagement means for receiving and securing a respective side link of the three point hitch;
 iii. a cross member connected between said vertical sides; and
 iv. upper and lower pivot mounts;

b. a stump grinder frame with an upper frame member pivotably attached to said pivot frame upper pivot mount and a telescoping lower frame member with one end pivotably attached to said pivot frame lower pivot mount;

c. a stump grinder assembly attached to an opposite end of said telescoping lower frame member, said stump grinder assembly, said stump grinder including:
 i. a gear box which connects to a telescoping PTO shaft; and
 ii. a grinding wheel linked to said gear box;

d. a telescoping hydraulic piston & cylinder unit with a first end attached to said stump grinder frame lower frame member and a second end attached to said stump grinder assembly;

e. a reciprocating hydraulic piston & cylinder unit with a first end pivotably attached to said pivot frame and a second end attached to said stump grinder frame such that said stump grinder assembly can be selectively telescopically extended relative to said stump grinder frame and said stump grinder frame can be selectively swiveled relative to said pivot frame.

6. A stump grinder as in claim 5, wherein said stump grinder assembly comprises:

(a) a hydraulic pump linked to said gear box.

7. A stump grinder as in claim 6, and further comprising:

(a) at least one hydraulic valve connected to said pump which valve selectively provides hydraulic fluid from said pump to either said telescoping piston & cylinder unit or said reciprocating piston & cylinder unit.

* * * * *